(12) United States Patent
Barry

(10) Patent No.: US 8,145,587 B2
(45) Date of Patent: Mar. 27, 2012

(54) TIME-BASED PROGRAMMING AND COMPUTATION

(75) Inventor: Andrew Barry, Braddon (AU)

(73) Assignee: Oracle International Corporation, Redwood Shores, CA (US)

( * ) Notice: Subject to any disclaimer, the term of this patent is extended or adjusted under 35 U.S.C. 154(b) by 939 days.

(21) Appl. No.: 12/036,461

(22) Filed: Feb. 25, 2008

(65) Prior Publication Data

US 2009/0077458 A1 Mar. 19, 2009

(30) Foreign Application Priority Data

Sep. 14, 2007 (AU) ................................ 2007905023

(51) Int. Cl.
*G06F 17/00* (2006.01)
*G06N 5/02* (2006.01)
(52) U.S. Cl. ......................................................... 706/47
(58) Field of Classification Search ...................... 706/47
See application file for complete search history.

(56) References Cited

U.S. PATENT DOCUMENTS

| 7,418,434 B2 * | 8/2008 | Barry | ............................... 706/47 |
| 2004/0117202 A1 | 6/2004 | Winklevoss et al. | |

OTHER PUBLICATIONS

Factory cycle-time prediction with a data-mining approach, Backus, P.; Janakiram, M.; Mowzoon, S.; Runger, C.; Bhargava, A.; Semiconductor Manufacturing, IEEE Transactions on vol. 19 , Issue: 2 Digital Object Identifier: 10.1109/TSM.2006.873400 Publication Year: 2006, pp. 252-258.*
Fault tree analysis and binary decision diagrams, Sinnamon, R.M.; Andrews, J.D.; Reliability and Maintainability Symposium, 1996 Proceedings. 'International Symposium on Product Quality and Integrity'., Annual Digital Object Identifier: 10.1109/RAMS.1996.500665 Publication Year: 1996, pp. 215-222.*
Simulating and calculating sky luminance distribution with CIE standard DS 011.2, Kobav, M.B.; Bizjak, G.; EUROCON 2003. Computer as a Tool. The IEEE Region 8 vol. 1 Digital Object Identifier: 10.1109/EUROCON.2003.1248078 Publication Year: 2003, pp. 516-520 vol. 1.*
Optimal time-interval for time-based location update in mobile communications, Yong Lee; Goo Yeon Lee; Global Telecommunications Conference, 2002. GLOBECOM '02. IEEE vol. 3 Digital Object Identifier: 10.1109/GLOCOM.2002.1188997 Publication Year: 2002, pp. 2079-2083 vol. 3.*

* cited by examiner

*Primary Examiner* — Michael B Holmes
(74) *Attorney, Agent, or Firm* — Kilpatrick Townsend & Stockton LLP

(57) ABSTRACT

A computer implemented method and system for calculating changepoints in a rule-based environment. At least one time-based value is created from at least one date value, and combined with at least one changepoint value to calculate changepoints. The changepoints are then formatted, and a report is generated and output for display to the user in plain language. In another aspect, a value is assigned to a time-based parameter and combined with a changepoint value to calculate changepoints.

15 Claims, 3 Drawing Sheets

| PersonsAge | |
|---|---|
| 0 | |
| on or after | value |
| May 1 1982 | 1 |
| May 1 1983 | 2 |
| ... | ... |

>

| EligibilityAge | |
|---|---|
| 18 | |
| on or after | value |
| Jan 1 2001 | 21 |

=

| IsEligible | |
|---|---|
| false | |
| on or after | value |
| May 1 1999 | true |
| Jan 1 2001 | false |
| May 1 2002 | true |

| value | |
|---|---|
| 3 | |
| on or after | value |
| Jan 1 1998 | 4 |
| Jan 1 1999 | 5 |

Figure 1a.

| value | |
|---|---|
| 3 | |
| on or after | value |
| Jan 1 1998 | 4 |
| Jan 1 1999 | 5 |

+  7  =

| value | |
|---|---|
| 10 | |
| on or after | value |
| Jan 1 1998 | 11 |
| Jan 1 1999 | 12 |

Figure 1b.

| value | |
|---|---|
| 3 | |
| on or after | value |
| Jan 1 1998 | 4 |
| Jan 1 1999 | 5 |

+

| value | |
|---|---|
| 7 | |
| on or after | value |
| Jan 1 1998 | 6 |
| Jan 1 2000 | 8 |

=

| value | |
|---|---|
| 10 | |
| on or after | value |
| Jan 1 1999 | 11 |
| Jan 1 2000 | 13 |

Figure 1c.

| PersonsAge | |
|---|---|
| 0 | |
| on or after | value |
| May 1 1982 | 1 |
| May 1 1983 | 2 |
| ... | ... |

> 18 =

| IsEligible | |
|---|---|
| false | |
| on or after | value |
| May 1 1999 | true |

Figure 2a.

| PersonsAge | |
|---|---|
| 0 | |
| on or after | value |
| May 1 1982 | 1 |
| May 1 1983 | 2 |
| ... | ... |

>

| EligibilityAge | |
|---|---|
| 18 | |
| on or after | value |
| Jan 1 2001 | 21 |

=

| IsEligible | |
|---|---|
| false | |
| on or after | value |
| May 1 1999 | true |
| Jan 1 2001 | false |
| May 1 2002 | true |

Figure 2b.

TemporalValueAt (

| IsEligible | |
|---|---|
| false | |
| on or after | value |
| May 1 1999 | true |
| Jan 1 2001 | false |
| May 1 2002 | true |

, June 30 2000 ) = true

Figure 2c.

TIME-BASED PROGRAMMING AND COMPUTATION

FIELD OF THE INVENTION

The present invention relates to a method and system for time-based programming and computation. More particularly, it concerns a system and method for calculating changepoints using time-based parameters in a policy environment.

BACKGROUND OF THE INVENTION

Many public and private sector organisations work in an environment where complex calculations are required to determine entitlements and obligations of customers against an ever-changing base of policy rules. Such rules may be business rules, or implementation of the law. This is particularly true of government agencies administering tax, social security, social services, immigration or compensation, for example. In addition, private institutions such as banks and insurers rely on complex framework for investments or claims.

Previous systems run loop-based code to devise segments of data. Such an approach involves a great deal of input/output data, where complex calculations rely on a significant number of input factors. These systems are inefficient as loop-based code tests for outcomes of every possible data result, that is, calculate values at every possible data point, when only a small segment of data is of interest, or the result only changes at certain data points.

For example, where eligibility payments are dependent on a claimant's age, there may only be five or six significant dates, yet previous loop-based coding tests for eligibility on potentially tens of thousands of different dates. The actual dates of interest are not distinguishable, and must be extracted by some means.

The present invention advantageously provides an alternative to existing time-based programming and computation in a complex policy environment.

SUMMARY OF THE INVENTION

According to an embodiment of the invention, there is provided a computer implemented system and method of calculating and displaying changepoints to an end user. At least one time-based value is created from at least one date value, and combined with at least one changepoint value to calculate changepoints. The changepoints are then formatted, and a report is generated to the user in plain language.

According to another embodiment of the invention, there is provided a computer implemented system and method of calculating changepoints in a rule-based environment. A value is assigned to a time-based parameter and combined with a changepoint value to calculate changepoints.

BRIEF DESCRIPTION OF THE DRAWINGS

FIGS. 1a-1c are block diagrams illustrating time-based value calculations in accordance with the present invention.

FIGS. 2a-2c are block diagrams illustrating time-based Boolean value calculations in accordance with the present invention.

DETAILED DESCRIPTION OF PREFERRED EMBODIMENTS

Figure 3:
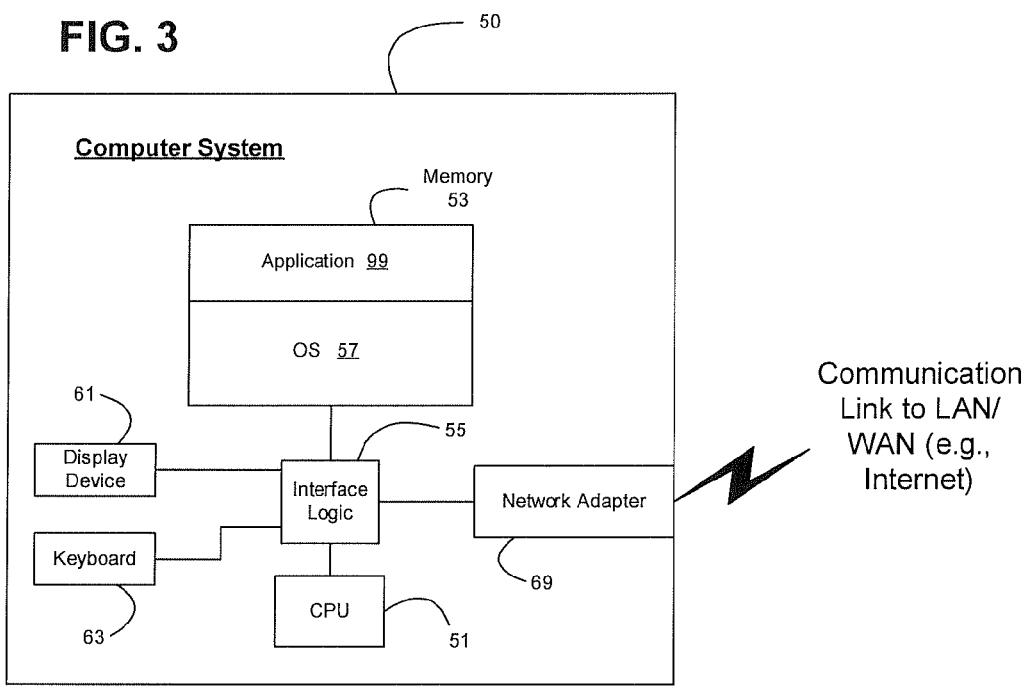
FIG. 3 is a functional block diagram of an exemplary computer processing system in which the present invention can be embodied.

The following description of preferred embodiments is not intended to limit the scope, configuration or applicability of the invention. An enabling description of at least one preferred embodiment is provided to allow the person skilled in the art to implement the invention. It is to be understood that the following description has been provided only by way of exemplification of this invention, and that further modifications and improvements thereto, as would be apparent to persons of skill in the art, are deemed to fall within the broad scope and ambit of the current invention described and claimed herein.

Furthermore, the following described embodiments may be implemented by hardware, software, firmware, middleware, microcode, hardware description languages, or the like, or any combination thereof. When implemented in software, firmware, middleware or microcode, the program code or code segments to perform the necessary tasks may be stored in a machine readable medium such as storage medium. One or more processors may perform the described methodology. A code segment or computer-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the following discussion and in the claims that follow, the term "computer-readable medium" is to be given a broad meaning and includes both portable or fixed storage devices, optical storage devices, wireless channels and various other mediums capable of storing, containing or carrying instructions and/or data.

Additionally, in the following discussion and in the claims that follow, the term "including" and "includes" are used, and are to be read, in an open-ended fashion, and should be interpreted to mean "including, but not limited to . . . ".

Further, in the following discussion and in the claims that follow, the term "time-based value" is to be given a broad meaning and relates to a time-varying value being a value that changes over time at specific changepoints. The term "changepoint" is also to be a broad meaning and relates to a date or time at which a time-based value changes its value.

The term "changepoint value" is to be given a broad meaning and relates to the value taken by a time-based value on or after a date or time associated with a relevant changepoint.

A claimant's entitlements and obligations are subject to constant change. Firstly, the actual rules that apply to a claimant are subject to change. For example, a new benefit component may be legislated by government for social security payments, or a special rule for high risk debtors may be introduced by a bank.

Additionally, reference data that is used to calculate specific rates of payment may also change. For example, every quarter a government agency may update its tax credit thresholds and payments, or an insurance company may review its risk thresholds monthly.

Finally, the data relevant to a claimant may change for a number of reasons. For example, a care provider receiving a government subsidy may provide services to a large number of end-customers who are constantly moving in and out of care. Similarly, the well-being of the customers of a health insurer may fluctuate from month to month.

As each of these elements is subject to constant change, a governance system is required to do the following:

Be capable of readily capturing and changing the rules, the applicability of which may vary over time Easily capture and update reference data and measure the impact of those change on claimants Represent claimant circumstances for a period of time, over which a calculation can then be made (for example, over a year);

Show the results of these calculations, identifying the rates applied to each time period, and aggregating these into a total amount; and Be capable of easily and readily changing the rules and reference data and measure the impact of that change on the claimants affected by the rule changes.

An embodiment of the present invention combines time-based values using traditional programming language expressions to provide the above characteristics in a simplified and reliable manner.

A simple time-based value according to an embodiment of the present invention is shown in FIG. 1a. The numeric value starts with the value of 3, and on the first of January 1998, it changes to 4. On the first of January 1999 it changes to 5.

Time-based values may be combined using traditional programming language expressions. For example, as shown in FIG. 1b, instead of calculating 3+7, the time-based value of FIG. 1a is added to the value of 7. Accordingly, the result is one in which the value is 10 initially. However, the value changes to 11 on the first of January 1998, and to 12 the following year.

Similarly, two time-based values may be combined as shown in FIG. 1c. As expected, the initial value is 10. However, in this example, the result has no changepoint for Jan. 1, 1998, as the increase in the first value is cancelled by the decrease in the second value which happens to occur on the same date. That is, the Jan. 1, 1998 changepoint value is removed because the result of 10 is also reached for that time period. Accordingly, an embodiment of the present invention collapses changepoint values to only identify the necessary changepoints.

It will be appreciated by those skilled in the art that the combining approach according to an embodiment of the present invention can be extended to all common scalar functions such as addition, subtraction, multiplication and division, comparisons and other typical functions that may be processed on a desktop or scientific calculator. It may also be used with Boolean logic.

An example of a time-based Boolean value according to an embodiment of the present invention is shown in FIG. 2a. In this example, the returned value is determinant of a person's age. Specifically, the value determines if a person is eligible for a benefit, which the person must be 18 years or older to achieve. The example relates to a calculation of a person born on May 1, 1981.

More complex logic may be employed. For example, should the eligibility age change to 21 years or older on Jan. 1, 2001, the Boolean value determination may be combined as shown in FIG. 2b. Here, eligibility changepoints are indicated as points in time when the person's age increases past the eligibility age, and when the eligibility age requirement changes.

Accordingly, the period for which the person is eligible for a benefit can simply be read off the combined resulting values (IsEligible result). There is no looping with mundane code or custom programming constructs.

An embodiment of the present invention allows logic to be expressed in plain or natural language, allowing time-based values and changepoints to be displayed in a user-friendly interface. That is, the temporal value is converted into a non-temporal value, as shown in FIG. 2c, for example. The natural or plain language of this calculation may be expressed as: "on Jun. 30, 2000 the person is eligible for the benefit."

If there is no value for a specific time period, or it would not make sense to ask for that value (the value has been provided to the best available knowledge, or it falls outside semantically meaningful scope, e.g. a person's age before they were born), "uncertain" parameters or values may be used during calculation and presentation of time-varying values.

The use of uncertainty allows calculations to be performed even in the absence of explicit values for a time period. This approach precludes the need to provide dummy or sentinel values with overloaded semantic meaning. For example, it may be possible to put an empty string as the initial value for a result; for instance, before a particular date. A sentinel value requires the calculation engine and the users of the results to know how to handle the sentinel value for each data type correctly. By using the value "uncertain" in accordance with the present invention, it is apparent that there is no value for that time period.

Use of "uncertain" allows results to be explicitly represented in terms of the available knowledge over different time periods. That is, only the parts of the calculation that are dependent on uncertain data will have uncertain results. All time periods for which sufficient information exists to render a result will successfully do so. Accordingly, results may be obtained even in the absence of complete information for all time periods, for all data values used in the calculation of changepoints.

The examples provided herein have demonstrated varying values on an annual basis; for example, a person's age. Such values have been shown as unboundedly increasing. However, in accordance with another embodiment of the present invention, an actual upper limit is used when performing time-based calculations, depending on the context of the usage scenario. For example, for calculation of future unemployment benefits, a date-based time window of approximately 20 years would likely be more than sufficient. Similarly, a retirement benefits calculation would need a higher bound of perhaps 30-40 years.

In view of the discussion above, it will be appreciated by those skilled in the art that a time-based value is used to calculate a condition or result at a particular point in time (changepoint value), and identify at what point in time a particular condition becomes true (changepoint). Table 1 shows example functions of how time-based values may be combined with changepoint values to determine the changepoint in accordance with an embodiment of the present invention:

TABLE 1

Time-Based Value Functions

| FUNCTION | CHANGEPOINT RESULT |
| --- | --- |
| ValueAt (datetime, value) | Retrieves the value result at the given datetime |
| When (datetime, Boolean value) | Retrieves the earliest time when the Boolean value is true, on or after the given datetime |
| WhenLast (datetime, Boolean value) | Returns the latest datetime when the Boolean value is true, on or before the given datetime |

TABLE 1-continued

Time-Based Value Functions

| FUNCTION | CHANGEPOINT RESULT |
|---|---|
| IntervalDailySum(datetime, datetime, value) | Calculates the sum of values between an interval, assuming the value is a rate "per day". |

It will also be appreciated by those of relevant skill that datetime parameters do not necessarily need to be non-temporal.

The following is a representative example of the present invention in a business rule system, using a simplified fictional pension calculation. It will be appreciated by those skilled in the relevant art that substantially identical issues arise in a number of business contexts where rules and rates change over time. Examples may include, but are not limited to: calculation of premiums payable by companies under a health insurance policy; payment of pensions to aged people; calculation of interest rates to debtors/creditors of a bank; entitlement calculations for social security benefits; or calculation of tax payable by citizens or businesses.

For this worked example, a pension payment is payable based on the following rules:
To receive a payment, the person must satisfy an age threshold:
Up until 1 Jan. 2007, the age threshold was 55 years of age;
From 1 Jan. 2007, the age threshold changed to 65 years of age.
The standard daily rate of a person's benefit is calculated according to the following:
$5 per day regardless of marital status up until 1 Jan. 2007;
After 1 Jan. 2007, it is either:
$6 per day if the person is not married; or
$7 per day if the person is married.
The actual daily rate paid to a person (the amount they are entitled to) is based on the following, regardless of which time period they fall into:
1× the standard daily rate if the person is not married;
1.5× the standard daily rate if the person is married.

The rules below are actual application code in accordance with an embodiment of the present invention, capturing the above-described business logic as rules in natural or plain language.

Total Entitlement

The person's total entitlement for a pension payment for the period, expressed in temporal function is:
IntervalDailySum (the start of the period, the end of the period, the person's daily entitlement for pension).

Each time-based value, changepoint, and changepoint value is determined below.

The person's daily entitlement identified as a changepoint value for the pension is reflected in Table 2.

TABLE 2

Daily Pension Entitlement

| Standard Daily Rate of Benefit | the person is not married and the person satisfies the age requirement |
|---|---|
| Standard Daily Rate of Benefit * 1.5 | the person is married and the person satisfies the age requirement |
| 0 | otherwise |

In accordance with the policy rules described above, the person satisfies the age requirement if the person was over 55 before 1 Jan. 2007, or over 65 on or after that date. Expressed in plain language in accordance with an embodiment of the present invention:

both
   TemporalBefore(Jan. 1, 2007) and
   the person's age in years >=55
or
both
   TemporalOnOrAfter(Jan. 1, 2007) and
   the person's age in years >=65

The person's age in years is calculated according to that person's date of birth. Expressed in a temporal function as a time-based value:
TemporalYearsSince (the person's date of birth).

Next, the standard daily rate is to be considered. This is shown in Table 3.

TABLE 3

Standard Daily Rate of Benefit

| 5 | TemporalBefore(Jul. 1, 2006) |
|---|---|
| 6 | TemporalOnOrAfter(Jul. 1, 2006) and the person is not married |
| 7 | TemporalOnOrAfter(Jul. 1, 2006) and the person is married |
| uncertain | otherwise |

For the purpose of example, a person who will receive the pension is born on the 1 Jan. 1950; and was married on 1 Apr. 2007 after initially being single. The fictional assessment period is 1 Jan. 2005 until 1 Jan. 2020.

Accordingly, the changepoint values for this example are shown in Table 4.

TABLE 4

Changepoint Values

| Date | Relevant Change | Type of Change |
|---|---|---|
| 1 Jan. 1950 | The person is born | Circumstance |
| 1 Jul. 2006 | Rate change for single/married people | Rate |
| 1 Jan. 2007 | New rules for age criteria | Rules |
| 1 Apr. 2007 | The person is married | Circumstance |

The changepoint values of Table 4 generate the changepoints shown in Table 5 for the fictional person in accordance with this example. Note there is no change in result on 1 Apr. 2007, as the person's rate does not change on that date (they do not satisfy the age requirements).

TABLE 5

Changepoints

| Date | Conclusion |
|---|---|
| 1 Jan. 2005 | The person turns 55<br>The person's daily rate is $5 per day |
| 1 Jul. 2006 | The person's daily rate is $6 per day |
| 1 Jan. 2007 | The person's daily rate is $0 per day as they no longer satisfy the age requirements which have changed |
| 1 Jan. 2015 | The person's daily rate is $10.50 per day |

A decision report utilising time-based values within the context of a business rule management system may be generated in accordance with an embodiment of the present invention. That is, varying results may be shown over a time period, allowing the determination of how a decision was arrived at.

Based on the above example, a decision report showing the data upon which the calculation of "the person's daily entitlement for pension" would be as follows:

the person's daily entitlement for pension is {0.0, 5.0 from 1 Jan. 2005, 6.0 from 1 Jul. 2006, 0.0 from 1 Jan. 2007, 10.5 from 1 Jan. 2015}
the person is married {false, true from 1 Apr. 2007}
the person satisfies the age requirement {false, true from 1 Jan. 2005, false from 1 Jan. 2007, true from 1 Jan. 2015}
the person's age in years is {0.0, 1.0 from 1 Jan. 1951, 2.0 from 1 Jan. 1952, 3.0 from 1 Jan. 1953 . . . }
the person's date of birth is 1 Jan. 1950
the standard daily rate of benefit is {5.0, 6 from 1 Jul. 2006, 7 from 1 Apr. 2007}
the person is married {false, true from 1 Apr. 2007}
Accordingly, the person's daily entitlement for pension is:

---

$0.00
$5.00 from 1 Jan. 2005
$6.00 from 1 Jul. 2006
$0.00 from 1 Jan. 2007
$10.50 from 1 Jan. 2015
Whether the person is married is
  False
  True from 1 Apr. 2007
Whether the person satisfies the age requirement is
  False
  True from 1 Jan. 2005
  False from 1 Jan. 2007
  True from 1 Jan. 2015
  The person's age in years is
    55 from 1 Jan. 2005
    65 from 1 Jan. 2015
    The person's date of birth is 1 Jan. 1950

---

The reporting function can then calculate the person's total pension entitlement from 1 Jan. 2005 to 1 Jan. 2020 to be $23017.50.

In a further embodiment of the present invention, the ability to debug the program code is provided. For example, the ability to watch a time-varying value can be represented as follows:

the person is married {false, true from 1 Apr. 2007}

Representing a value as a series of time-based values allows the user of the system a simple visualization of the rule. Other visualization techniques may include the ability to show a timeline of a set of time-based values, with a combined set of change-points lined up for each value. The visualization of the rule provides simple identification of code error that may be rectified.

The system and method of the present invention is significantly faster than conventional coding, both for initial rule definition and deployment, as well as ongoing maintenance. The expression of the logic is more concise and comprehensible than using application code, which is a particular advantage for business analysts possessing little programming skill. Further, it will be appreciated that retrospective calculations can be displayed in a transparent way to end users and customers, with suitable explanation stored for review and appeal.

The resulting calculation engine may be integrated and used by any case management system including for self service.

Turning now to FIG. 3, there is shown an exemplary computer system that can be used to execute the methodologies of the present invention as described herein. The computer system can be any of a number of computer devices including a personal computer, laptop, workstation, server and the like. The computer system includes a central processor unit 51 that is interfaced to memory 53 by interface logic 55. The memory 53, which is typically realized by persistent memory (such as one or more ROM memory modules and/or one or more flash memory modules) as well as non-persistent memory (such as one or more DRAM modules), stores an operating system 57 as well as an application 99 for carrying out the methodologies described herein. The central processor unit 51 also interfaces to a display device 61 (e.g., a liquid crystal display panel), a keypad or keyboard 63 and/or other user input device (e.g., a touch screen disposed on the display device 61) and possibly other devices (e.g., a microphone for voice input and one or more speakers for voice/audio output. The central processor unit 51 may also interface to a communication subsystem 69 that provides for bidirectional communication with a communication network (e.g., a local area network and/or a wide area network, such as the Internet). The operating system 57 and the application 99 are typically stored in a storage device, such as magnetic disk drive or disk array (not shown), and loaded into memory 53 as needed. The application 99 may also be stored on a program storage device (e.g., an optical storage disk such as a CD-ROM or DVD) and loaded/installed onto the storage device of the computer system 50 via an optical disk drive or the like. The application 99 may also be stored on a remote computer and loaded/installed onto the storage device of the computer system 50 via the communication network (e.g., downloaded over the Internet).

It will be appreciated by those of relevant skill in the art that the present invention may be applicable to any expression-based programming language and computing system, including, but not limited to, procedural languages such as C, Java, or the .NET languages; functional languages such as Lisp or ML; business rule management applications; and spreadsheet applications such as Microsoft Excel.

The claims defining the invention are as follows:

1. A computer implemented method of calculating and displaying changepoints to an end user, including:
creating at least one time-based value from at least one date value;
combining the at least one time based value with at least one changepoint value to calculate changepoints;
formatting the changepoints; and
generating a report of the changepoints to the user in plain language.

2. A method according to claim 1, wherein the combining includes common scalar functions to calculate the changepoint.

3. A method according to claim 2, wherein the combining further includes Boolean logic to calculate the changepoint.

4. A computer implemented method of calculating changepoints, including:
assigning a value to a time-based parameter; and
combining the time-based parameter value with a changepoint value to calculate changepoints.

5. A method according to claim 4, wherein changepoints are displayed to a user in plain language.

6. A method according to claim 5, wherein the combining includes common scalar functions to calculate the changepoint.

7. A method according to claim 6, wherein the combining further includes Boolean logic to calculate the changepoint.

8. A system comprising logic stored on a computer readable medium, operable to:
- create at least one time-based value from at least one date value;
- combine the at least one time based value with at least one changepoint value to calculate changepoints in a rule-based environment;
- format the changepoints; and
- generate a report of the changepoints to a system user in plain language.

9. A system comprising logic stored on a computer readable medium, operable to:
- assign a value to a time-based parameter; and
- combine the time-based parameter value with a changepoint value to calculate changepoints in a rule-based environment.

10. A computer system comprising:
- means for create at least one time-based value from at least one date value; and
- means for combining the at least one time based value with at least one changepoint value to calculate changepoints in a rule-based environment.

11. A computer system according to claim 10, further comprising:
- means for formatting the changepoints.

12. A computer system according to claim 10, further comprising:
- means for generating a report of the changepoints in plain language.

13. A program storage device readable by a machine, tangibly embodying a program of instructions executable by the machine to perform method steps for evaluating an investment over a predefined investment period, said method steps comprising:
- creating at least one time-based value from at least one date value; and
- combining the at least one time based value with at least one changepoint value to calculate changepoints.

14. A program storage device according to claim 13, said method steps further comprising:
- formatting the changepoints.

15. A program storage device according to claim 13, said method steps further comprising:
- generating a report of the changepoints to the user in plain language.

* * * * *